United States Patent [19]

Singh

[11] Patent Number: 4,744,739
[45] Date of Patent: May 17, 1988

[54] TIRE CURING PRESS

[75] Inventor: Anand P. Singh, Youngstown, Ohio

[73] Assignee: NRM Corporation, Columbiana, Ohio

[21] Appl. No.: 10,012

[22] Filed: Feb. 2, 1987

[51] Int. Cl.⁴ .............................................. B29C 33/00
[52] U.S. Cl. ..................... 425/34.1; 294/97; 294/113; 414/626; 425/38
[58] Field of Search ............ 425/34 R, 38; 414/744 A, 626, 753, 910; 294/93, 97, 113

[56] References Cited

U.S. PATENT DOCUMENTS

| | | | |
|---|---|---|---|
| 1,895,909 | 1/1933 | Blaker | 425/38 |
| 2,946,088 | 7/1960 | Soderquist | 425/38 |
| 3,162,224 | 12/1964 | Loveland | 294/113 |
| 3,167,810 | 2/1965 | Soderquist | 425/38 |
| 3,380,115 | 4/1968 | Soderquist | 425/38 |
| 3,564,649 | 2/1971 | Soderquist | 425/38 |
| 4,578,023 | 3/1986 | Irie | 425/34 R |
| 4,580,958 | 4/1986 | Crumbacher et al. | 425/34 R |

Primary Examiner—Willard Hoag
Attorney, Agent, or Firm—Renner, Otto, Boisselle & Lyon

[57] ABSTRACT

A tire press having upper and lower cavity molds with a tire loader which is vertically and horizontally movable and has a chuck which grips a tire by the tread rather than the bead. The gripper has plural gripping shoes movable by bell-cranks and piston actuators. The chuck of the invention grips a tire by the tread and positions it adjacent a mold where the tire bead is gripped by a second chuck (not claimed) which deposits the tire in the mold.

35 Claims, 19 Drawing Sheets

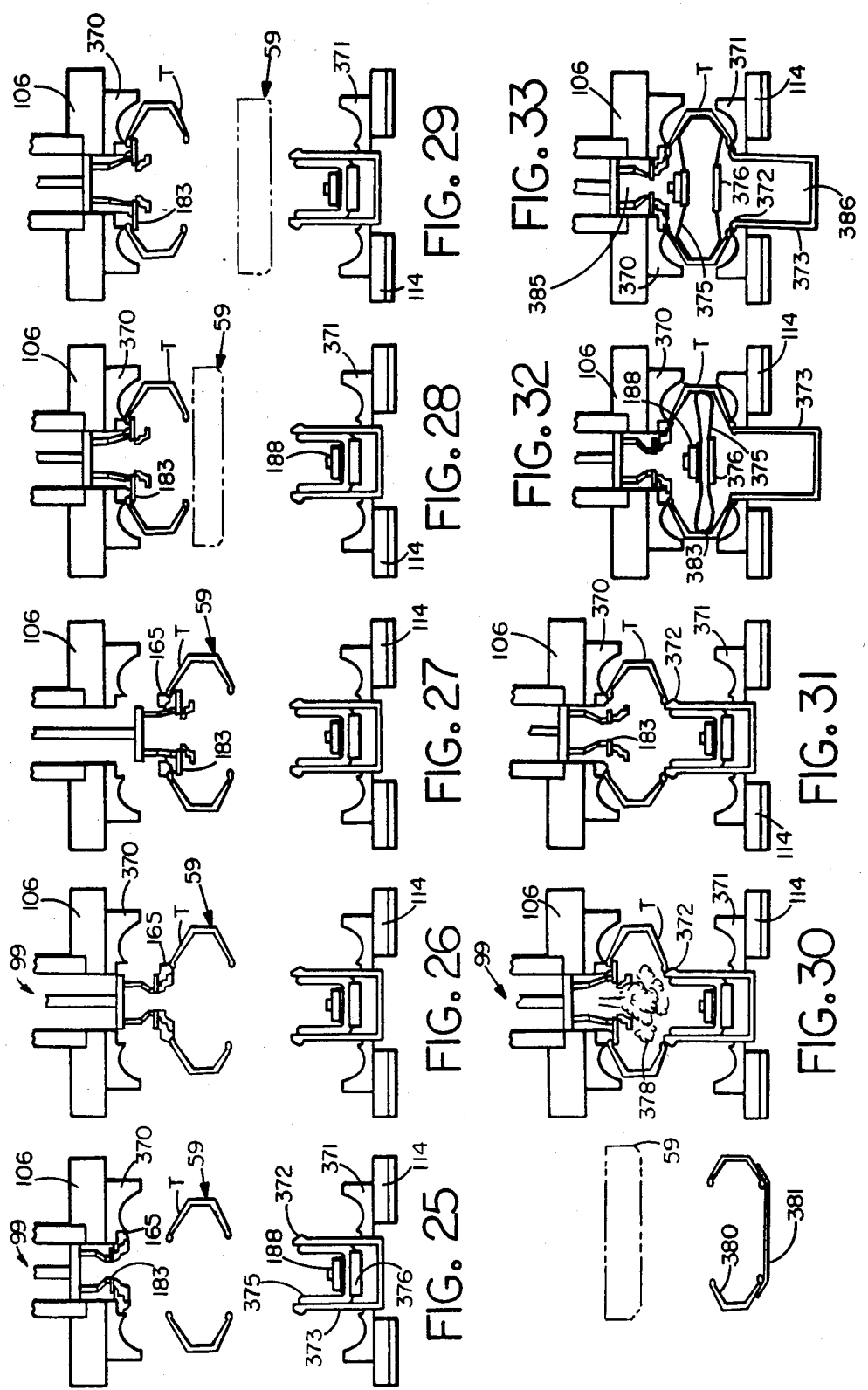

TIRE CURING PRESS

This invention relates generally as indicated to a tire curing press and more particularly to a hydraulic tire press.

BACKGROUND OF THE INVENTION

The present invention comprises certain improvements in a tire press of the type manufactured and sold by NRM Corporation of Columbiana, Ohio, U.S.A., under the trademark AUTOLOK. Such presses are generally illustrated for example in U.S. Pat. Nos. 4,338,069 and 4,332,536, and are twin cavity presses wherein the top cavities of the press are supported from a single center circular column for opening and closing. The top cavities are locked to the bottom cavities by rotating bayonet lock rings. The upper cavity or mold sections may be supported for such movement from a V-shape beam. However, the presence of the beam comprises an obstruction if fairly complex top center assemblies or mold height adjustment mechanisms are employed. Such center assemblies may be rather complex and project above the top cavity and operate, for example, sectional molds, the top mold bead ring, and top loading chucks. Both clearance and access to such assemblies is required for maintenance and replacement purposes. Accordingly if the top mold cavities can be supported properly laterally of the upper mold cavities from the center column a more functional and lower cost press can be provided.

Also, in the precision curing of tires mold alignment is a matter of concern, and is sometimes difficult to achieve, particularly with complex frame structures. The single center column of the present invention is particularly suited for obtaining precise mold alignment. The twin cavity upper structure of the press may swing on the vertical axis of the column, and if properly guided on the exterior or remote from the center column at only a single location, the proper alignment of both cavities may be achieved. If the single alignment guide is about twice the distance from the axis of the column as the mold axis, any misalignment at both mold axes will be only about half such misalignment. Moreover, with the approximate two-to-one factor adjustments are easier to make. It has been found that such alignment guiding may conveniently be from one of the loader columns in front of the press.

Precision tire curing also requires precision loading of the press. This requires that the tire be picked up properly and held properly for subsequent transfer to the bead rings of the molds. Because tire sizes change a loader requires substantial versatility and in fairly limited space. The ideal place to pick up a tire for loading is at the belted tread area leaving the bead area free. This however requires a loader chuck of substantial diameter. One way of gripping such tires is through the use of an inflatable bladder as shown in U.S. Pat. No. 4,447,385. However, such bladder type chucks don't have the precision of adjustability or versatility of reach of mechanical chucks. Accordingly a mechanical chuck which will fit in a large diameter circular yet radially narrow space and still have precision adjustability and substantial reach is desirable.

Also, with fairly massive tires the loader should be able to raise the tire from a precise pick-up position, move or swing it to a position aligned with the mold axes, and then possibly further raise or lower the tire, all without excessive shock to the tire, which could cause damage or misalignment.

The top loading of uncured tires has been developed as a superior manner of introducing uncured tires into a tire press. The preferred process brings the uncured tire top bead initially adjacent the extended top mold bead ring, then the bottom mold bead ring. At this point the tire may be air inflated to center and snap the beads of the uncured tire onto the mold bead rings. As an illustration of tire presses utilizing a top or bead ring loading process, reference may be had to U.S. Pat. Nos. 4,447,385; 4,444,715 and 4,608,219. A top center assembly for such process requires a chuck which is simple and compact and yet quite sturdy. The chuck must also be readily adjustable to control the extent of opening.

It is also desirable that the chuck be simple to operate and yet operate properly and in conjunction with other actuators in the fairly complex top center assembly of each mold cavity. The chuck should also be able to operate with any type center or shaping bladder mechanism. It should also not interfere with the air inflation of the uncured tire for centering and seating of the beads. The inlet for such air inflation should be axially aligned with the beads and yet not sufficiently close to the tire or beads in any way to cause the tire to move off center.

SUMMARY OF THE INVENTION

A hydraulic tire press of the twin cavity type uses a single center column for opening and closing the press and one side guide, the latter being a column for one of two loaders in front of the press. The upper mold cavities are laterally secured to a yoke frame moving on such column leaving the top of the press cavities clear for top center assemblies and mold height adjustment mechanisms. The top center assembly includes a chuck for positioning the upper bead of an uncured tire adjacent the top mold bead ring initially, which chuck includes radially horizontally reciprocating movable flat plate shoes. The top center assembly includes a pair of sectional mold operators, a top mold bead ring operator, and a chuck operator, each arranged in cascading fashion, to open the sectional molds, extend the bead ring, and extend the chuck. The top center assembly also includes a pair of relatively small operators to extend and retract the radially movable shoes of the chuck when the latter is vertically extended from the mold bead ring. All of the operators are insulated from the heat of the press. An air inlet for bead seating of the uncured tire is provided at the center of the assembly. In order to position the tire within the open press there is provided a tread grip loader able to grip tires of varying and substantial size and position them in proper position to be loaded either initially into the upper or lower mold section.

The loader includes a mechanical chuck which occupies a narrow yet large diameter area when retracted and which has substantial radial yet adjustable reach. The loader is mounted for precision alignment and swinging from a pick-up to a loading position in the open tire press.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings

FIG. 25-33 are schematic illustrations of a portion of the loading cycle of the press illustrating the transfer of the uncured tire to proper seating with the bead rings of the press.

DETAILED DESCRIPTION OF THE PREFERRED EMBODIMENTS

Figure 1:
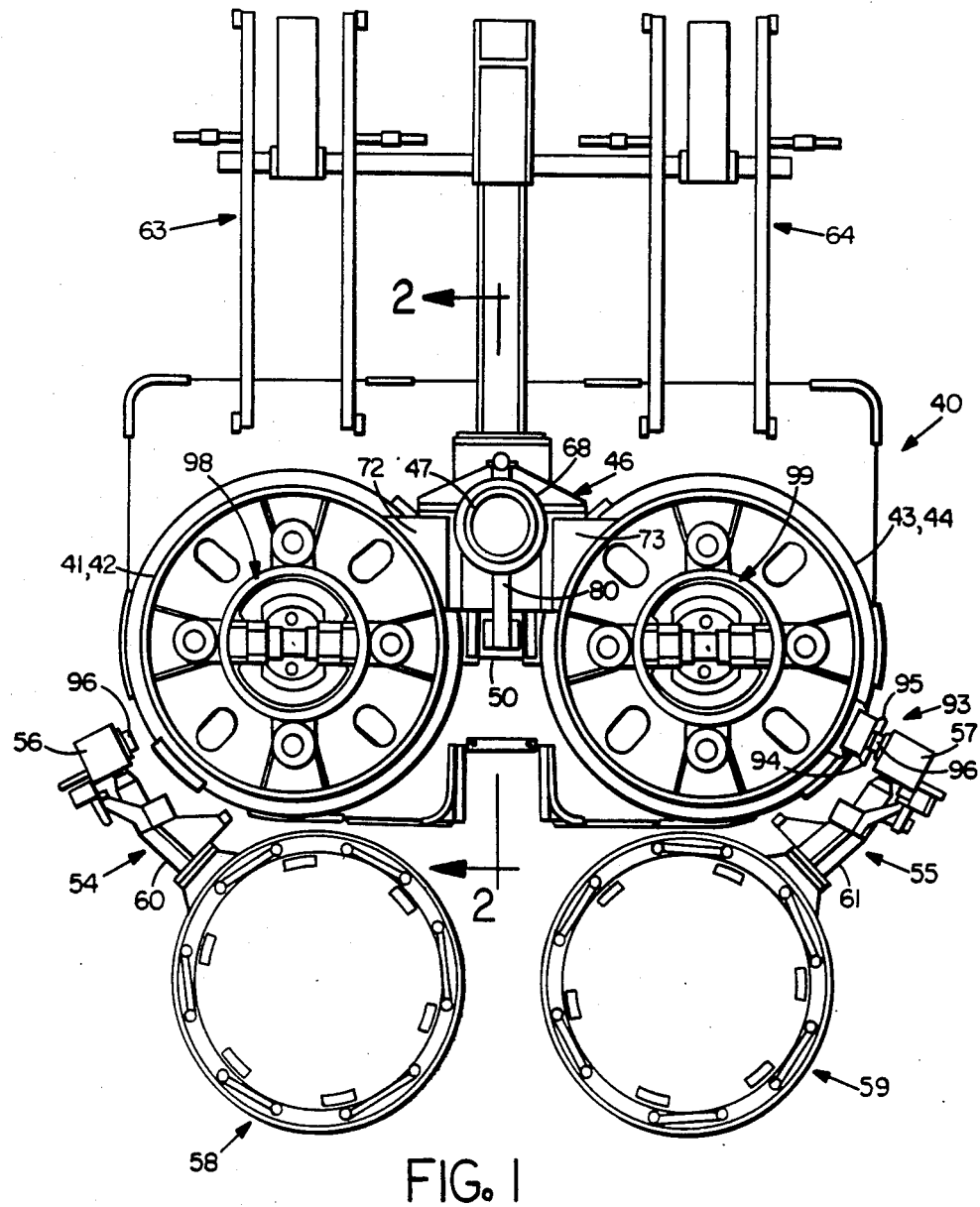
FIG. 1 is a top plan view of a twin cavity tire press in accordance with the present invention.

Referring first to FIGS. 1-5 there is illustrated a tire press 40 in accordance with the present invention. The press is of the dual cavity type and includes side-by-side top and bottom mold cavities 41, 42, and 43, 44 (see FIG. 3). The bottom mold cavities 42 and 44 are mounted on base 45 and are fixed while the upper cavities 41 and 43 are laterally interconnected by yoke 46 which is mounted for vertical sliding movement on tubular column 47. The yoke 46 and thus the upper mold cavities 41 and 43 are moved vertically by a piston-cylinder assembly 50, and rod 51 of which is pivotally connected at 52 to the yoke 46.

Positioned in front of the press as seen in FIG. 1 are loader assemblies shown generally at 54 and 55 which are mounted on loader columns 55 and 56, respectively. Each loader includes a tire gripping chuck as seen at 58 and 59 which is mounted on respective swing arms 60 and 61. The loader chucks are shown in FIG. 1 in the loader pick-up position in front of the press.

To the rear of the press, each cavity is provided with an unloader shown generally at 63 and 64 which lifts the tire from the open bottom press cavity to remove it to the rear of the press or the top of FIG. 1.

Figure 2:
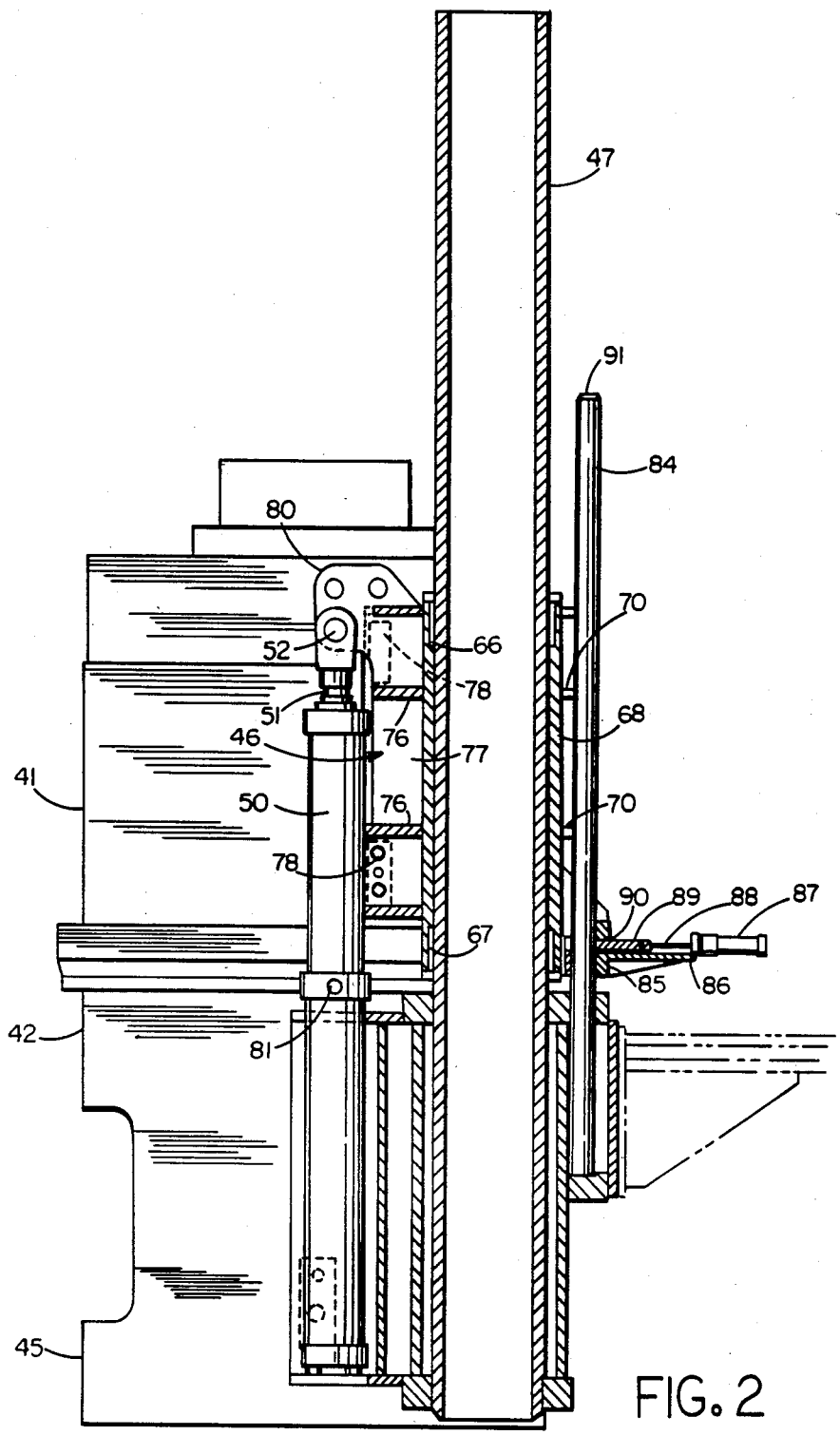
FIG. 2 is an enlarged fragmentary vertical section through the center support column as seen from the line 2—2 of FIG. 1.

As seen in FIG. 2, the yoke 46 is of substantial vertical height and is provided with vertically spaced bushings 66 and 67 which ride on the tubular column 47. The bushings are mounted in large tubular sleeve 68 which forms part of the yoke 46. Secured to the sleeve at the back of the press are a series of relatively shallow triangular plates 70 which are connected through shims 71 to the rear faces of triangular projections 72 and 73 which are secured to the cylindrical exterior of cylindrical walls 74 and 75 of the upper cavities 41 and 43. At the front of the column 47 the yoke includes horizontal plates 76 secured to the sleeve 68 and between end walls 77 which are fastened at 78 through shims 79 to the interior of the triangular projections 72 and 73. The yoke includes bracket 80 to which the rod 51 of the piston-cylinder assembly 50 is pivotally connected at 52. The piston-cylinder assembly is trunnion mounted at 81 between the mold cavities.

As seen in FIG. 2 at the rear of the column 47 there is provided a vertically extending fixed rod 84. Such rod is surrounded by sleeve 85 mounted on the lower rear end of the yoke 46. The sleeve includes a shelf projection 86 on which is mounted piston-cylinder assembly 87. The rod 88 of such piston-cylinder assembly is connected to horizontally sliding lock plate 89, which when extended slides through opening 90 in the sleeve 85. The lock plate 89 may be extended when the press is open and when extended is positioned over the top of rod 84 as seen at 91. The lock plate then serves as safety preventing the upper mold cavities from dropping when the press is fully open. The press cannot close until the lock plate is retracted as shown in FIG. 2.

The yoke 46 which is mounted on the vertical column 47 serves to interconnect the two upper cavities or mold sections 41 and 43 and rigidifies them as a single unit. In order to keep the upper mold sections from rotating about the axis of the column 47 thus moving the mold axes to a position of misalignment, the exterior of the upper mold cavity 43 is provided with a roller assembly 93 which includes adjustable opposed rollers 94 and 95 riding against the sides of guide rail 96 mounted on the interior of loader column 57. While the loader column 56 is also provided with a guide rail 96, there is no guiding connection between that rail and the upper mold cavity 41. Since the guide assembly 93 is approximately twice the distance from the center of column 47 as the mold axes, any adjustment or movement at the assembly 96 will result in approximately half that movement at the mold axes. In this manner the alignment of the mold sections in each cavity can easily be maintained.

Another advantage of the yoke configuration interconnecting the side or lateral cylindrical walls of the upper cavities is that the top of the upper mold cavities is then clear for placement of center assemblies 98 and 99 for each top mold cavity as well as drives 100 and 101 for mold height adjustment mechanisms.

Figure 3:
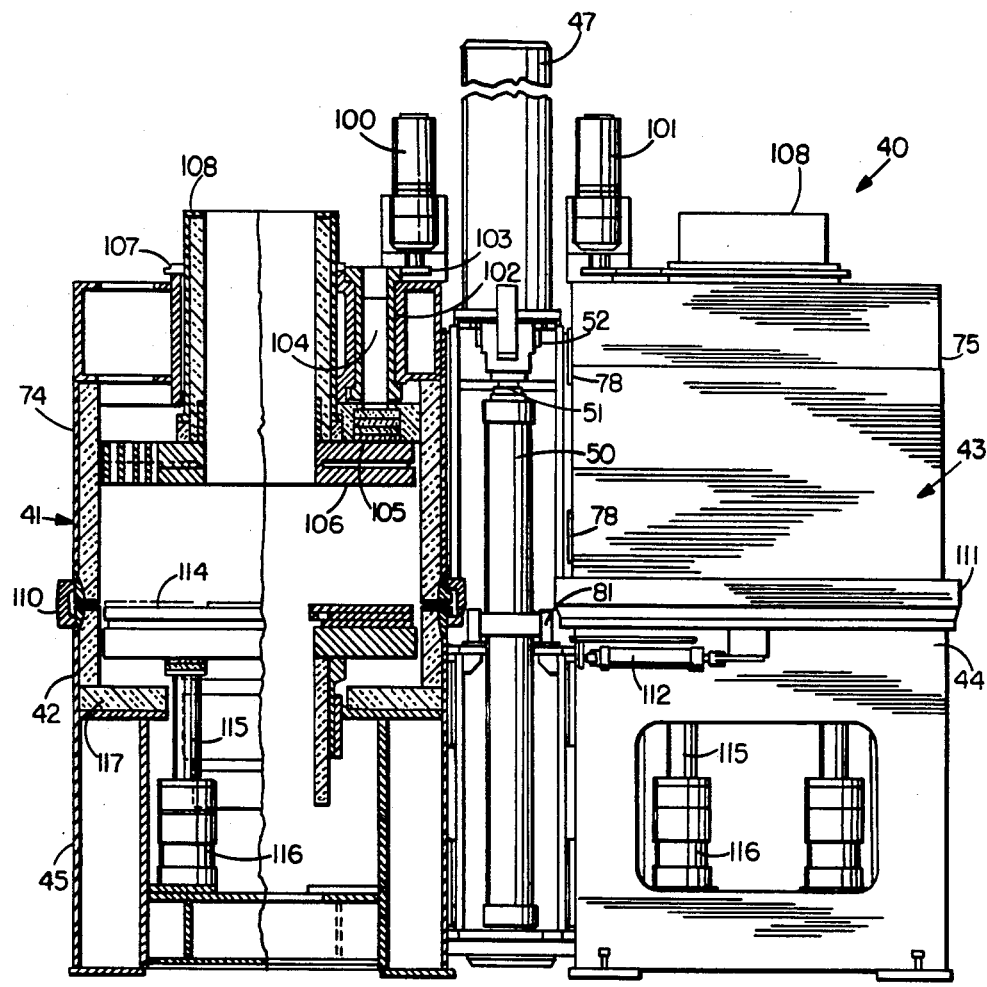
FIG. 3 is a front elevation of the press partially broken away and in section with the molds, top center assembly and center mechanism omitted.
Figure 4:
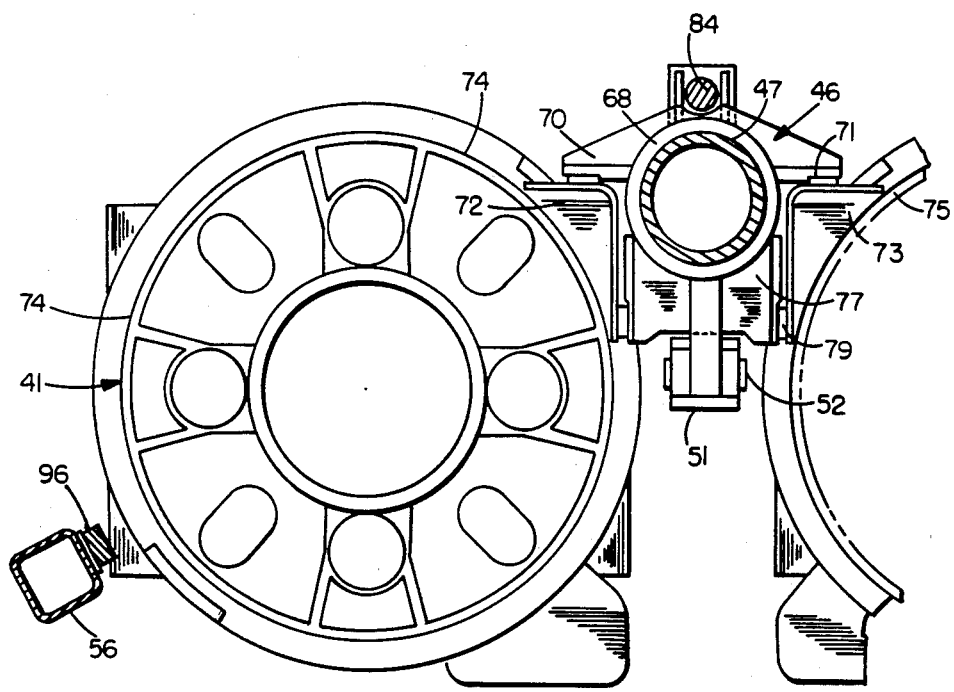
FIG. 4 is a somewhat enlarged fragmentary horizontal section taken from above the cavities.
Figure 5:
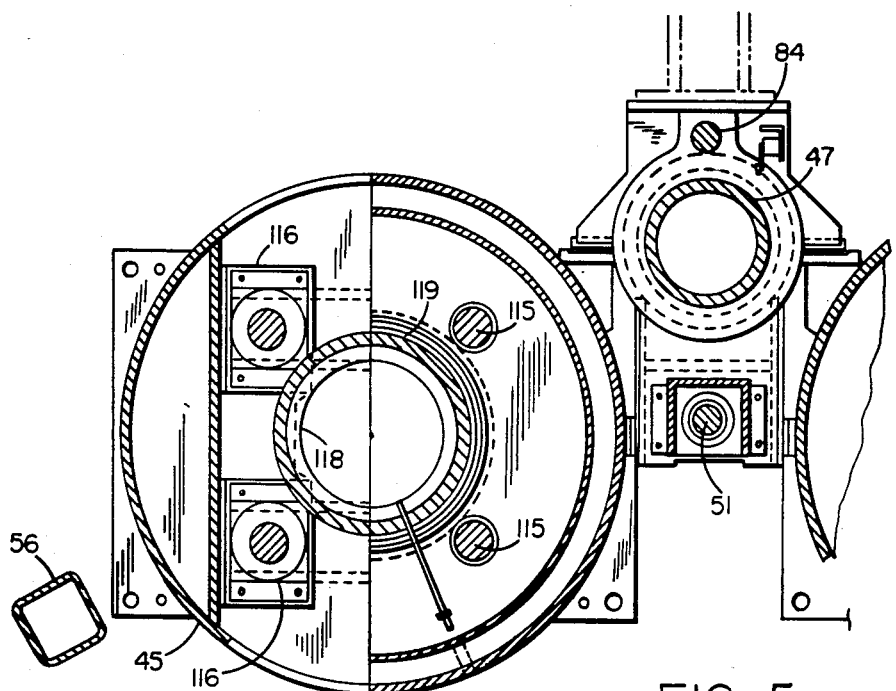
FIG. 5 is a similar section through the lower cavities.
Figure 6:
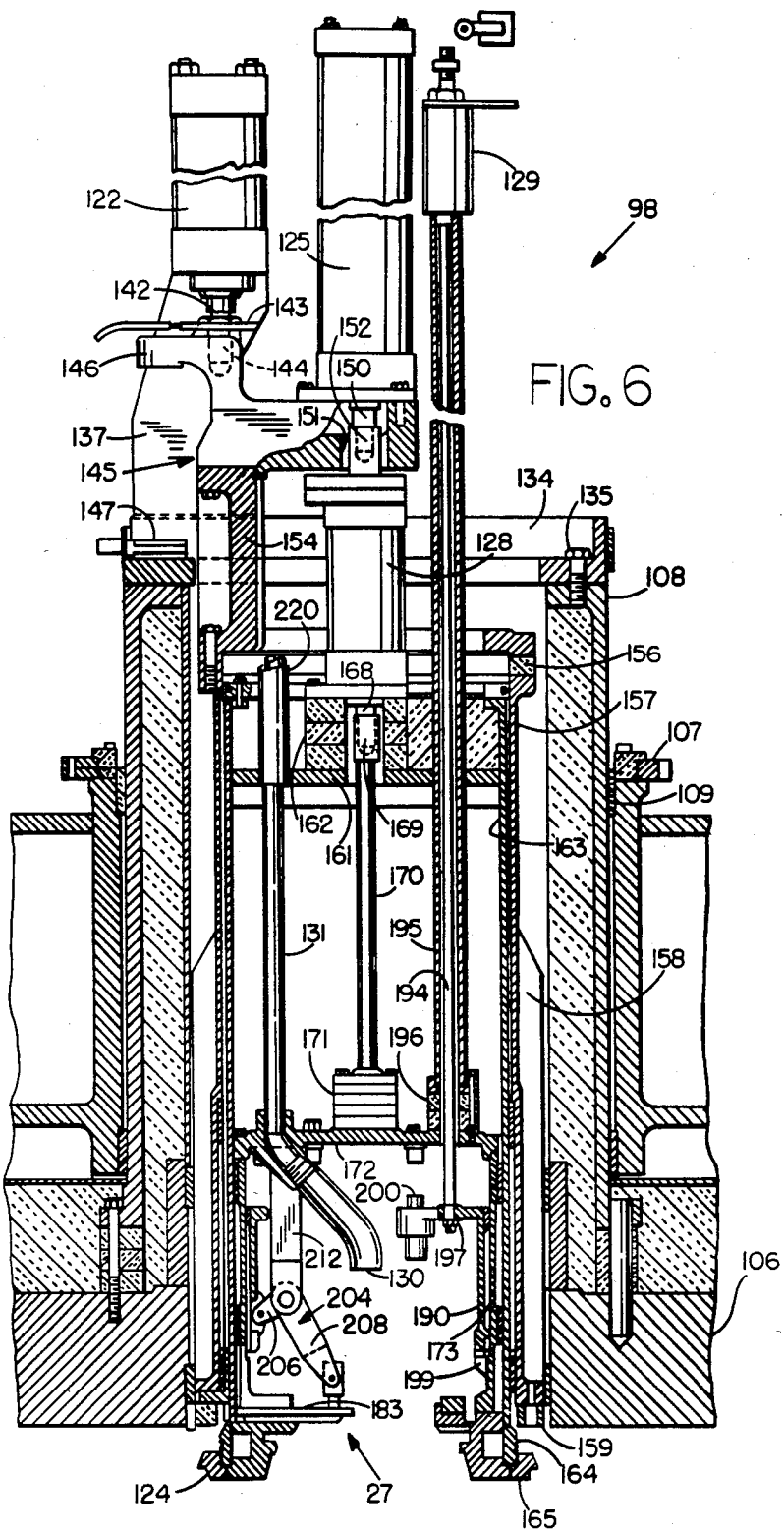
FIG. 6 is an enlarged fragmentary vertical section through the top center assembly as taken from the line 6—6 of FIG. 10.

As seen in FIG. 3 such drives 100 and 101 rotate sleeve nuts 102 through suitable gearing 103. Such sleeve nuts are in mesh with threaded shafts 104 which are connected through pads 105 to top platen 106. There will be two such threaded nuts and shafts on opposite sides of the top mold axis with the threaded nut not shown being rotated by relatively large gear 107. In this manner the top platen 106 may be adjusted vertically to accommodate within the press different size molds. The top center assemblies are mounted on the open column 108 which moves with the top platen during mold height adjustment. As seen more clearly in FIG. 6 the column is mounted on bushings 109 which guide the top platen for such adjustment.

Each top cavity is locked to the bottom cavity when the press is closed by a rotating bayonet lock ring as seen at 110 and 111 which are rotated to and from locking position by respective piston-cylinder assemblies 112.

Bottom platens 114 are supported for short distance clamping movement on the rods 115 of hydraulic clamp piston-cylinder assemblies 116 positioned in the base of the press. There may be four such hydraulic clamp cylinders equally circumferentially spaced around the center of the bottom cavity. The hydraulic cylinders 116 are positioned below the major heat insulation of the bottom cavity as seen at 117 and serve to provide a high pressure squeeze during cure of the tire. The bottom platen includes depending center sleeve 118 in which the center mechanism is provided. The center mechanism includes mechanisms for vertically actuating the bottom bead ring of the mold and also the tire shaping bladder. The sleeve 118 is mounted for sliding movement in annular ring 119 in the base of the press.

Referring now to FIGS. 6–10 there is illustrated a top center assembly 98. Each top center assembly serves several functions in the operation of the tire press. One function is to operate the sectional mold mechanism during opening and closing of the press. Operation of the sectional mold mechanism is obtained by moving the top mold section vertically with respect to the top platen. This is accomplished by a pair of hydraulic piston-cylinder assemblies 122 and 123. Another purpose is to move the top bead ring 124 vertically with respect to the top mold section. This is accomplished by pneumatic piston-cylinder assembly 125. Another purpose is to move top loading chuck shown generally at 127 vertically with respect to the bead ring 124 and this is accomplished by pneumatic piston-cylinder assembly 128. Another purpose is to open and close the top loading chuck and this is accomplished by a pair of relatively small pneumatic piston-cylinder assemblies 129.

A further purpose is to provide an air inlet for the envelope of the uncured tire when the beads thereof are adjacent the top and bottom mold bead rings so that the tire can be snapped onto the beads with air pressure. It is important that the air inlet be centered with regard to the beads of the tire and such air inlet is shown at 130. The pipe 131 to which the air inlet is connected may also be connected to a source of vacuum to assist in the introduction of the shaping bladder into the tire. During that phase of the loading process a vacuum will minimize air entrapment between the bladder and tire.

The top center assembly 98 is mounted on the column 108 by means of semicircular brackets 133 and 134 which are secured in place by fasteners 135. Each bracket includes at its ends upstanding legs 136 and 137 with the legs of the opposed brackets facing each other and somewhat spaced apart. Each leg is somewhat offset radially inwardly as illustrated more clearly in FIG. 6. Such legs provide support pads 138 to which the rod ends of the piston-cylinder assemblies 122 and 123 are secured by the fasteners 139.

The rods 142 of each such piston-cylinder assembly extend through oil drip pans 143 which divert any oil which might leak from such cylinders away from the top of the press. Such rods are secured as indicated at 144 to a frame 145 which supports on the top thereof at the center piston-cylinder assembly 125. Such frame also includes between the opposed bracket legs offsets 146 which are designed to engaged adjustable shim stops 147 to limit the stroke of the piston-cylinder assemblies 122 and 123.

Rod 150 of the piston-cylinder assembly 125 extends through hole 151 in the frame 145 and is secured at 152 to the blind end of piston-cylinder assembly 128.

Secured to the underside of the frame 145 is a flanged stool 154, the lower flange of which is secured by the fasteners illustrated through a layer of insulation 156 to vertically extending sleeve 157. Such sleeve at its lower end includes stiffening ribs 158 and at its very bottom includes pads 159 to which the upper mold half is connected. In this manner extension of the piston-cylinder assemblies 122 and 123 causes the upper mold half to move with respect to the platen to open the sectional mold segments, not shown. Retraction causes them to close.

The rod end of the piston-cylinder assembly 128 is connected to an annular plate 161 through layers of insulation 162. The annular plate 161 is secured to the interior of sleeve 163 which telescopes within the sleeve 157. Mounted on the lower end of the sleeve 163 is a threaded ring 164 to which the bead ring 165 of the top mold section is secured.

The rod 168 of the piston-cylinder assembly 128 is connected at 169 to rod 170 extending through plate 161 and the insulation pads 162. The rod 170 is connected through insulation pads 171 to plate 172 to which is secured depending sleeve 173 which telescopes within the lower end of sleeve 163 on the slide bushings indicated at 174 and 175 in FIG. 7.

The lower end of the sleeve 173 is provided with a flange 176 to which hub 177 is secured by the fasteners 178. The top of the hub is provided with radially extending guide passages 179 which accommodate three plate type radially extending chuck shoes 181, 182 and 183 seen more clearly in FIG. 9. The lower end of the hub 177 includes an outwardly directed flange which provides an upwardly directed shoulder which seats against the lower end of the ring 164 to which the bead ring 165 is secured. In this manner, in the retracted position of the chuck 127 the hub is brought flush with the bead ring 165. The inner edge of the hub is provided with a tapered opening seen at 186 within which seats the top clamping assembly 188 of the shaping bladder of the center mechanism.

Radial movement of the chuck shoes 181–183 is obtained by vertical movement of sleeve 190 which telescopes within the sleeve 173 on bushings 191 and 192.

Such sleeve is moved vertically by rods 194 of relatively small piston-cylinder assemblies 129 which are mounted on top of tubes 195. Such tubes are secured to the plate 172 as indicated at 196 and such tubes and thus the piston-cylinder assemblies 129 move with such plate. The rods 194 are connected to the sleeve 190 as indicated at 197. The sleeve moves upon retraction of the piston-cylinder assembly 129 from a fixed stop 199 at the lower end thereof to a stop 200 on the underside of the plate 172. The stops 200 are engaged by adjustable buttons 201 at the top of the sleeve.

Vertical upward movement of the sleeve causes bell cranks 204 to pivot about the pivots 205 since the short arm 206 of the bell crank is pivotally connected to the sleeve as indicated at 207. The longer arm 208 is pivotally connected to a sleeve 209 which rides on pin 210 projecting upwardly from the inner end of each chuck shoe. The bell cranks are pivoted at 205 to the lower ends of brackets 212 secured to the underside of the plate 172 by the fasteners 213. Thus as the sleeve 190 moves up with respect to sleeve 173 the chuck shoe plates slide radially outwardly. As the sleeve 190 moves down, the chuck shoe plates retract or slide inwardly.

Figure 7:
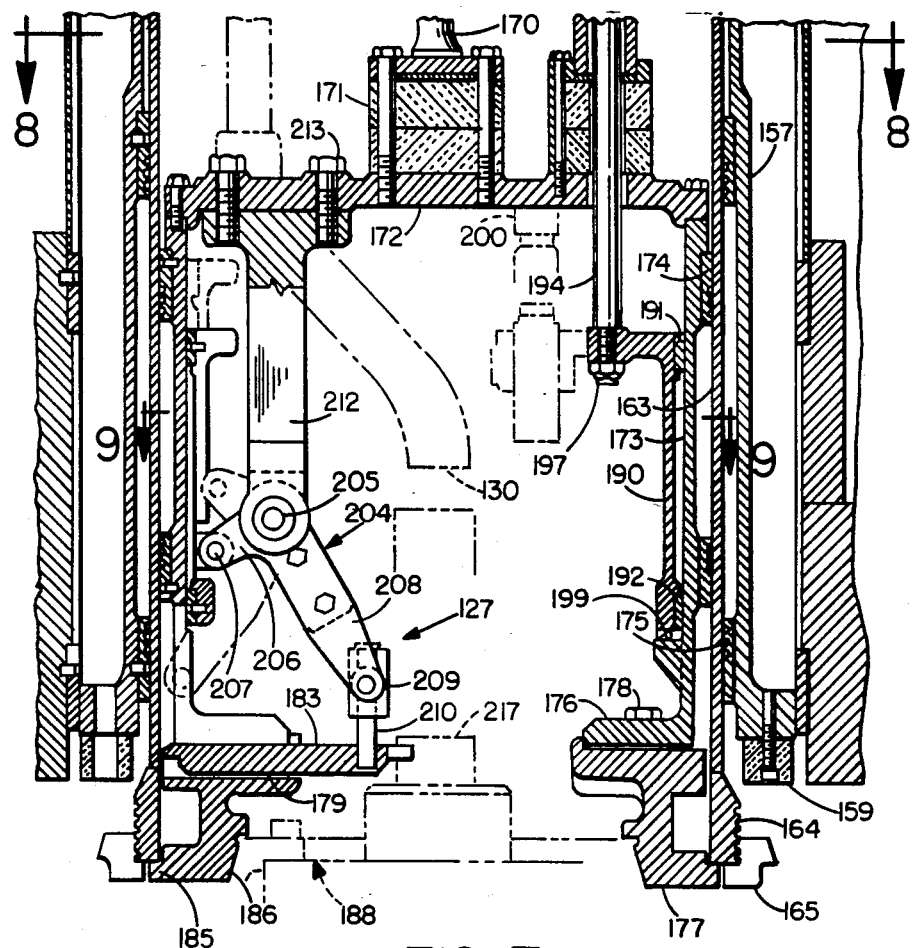
FIG. 7 is somewhat further enlarged vertical section through the chuck at the lower end of the top center assembly.
Figure 8:
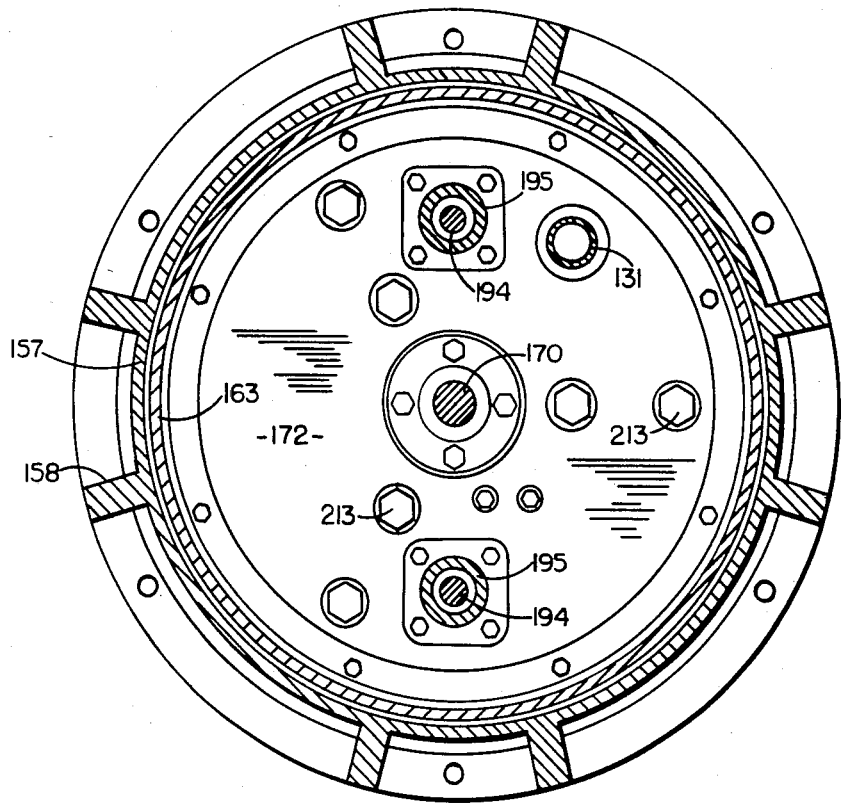
FIG. 8 is a horizontal section of the top center assembly taken from the line 8—8 of FIG. 7.
Figure 9:
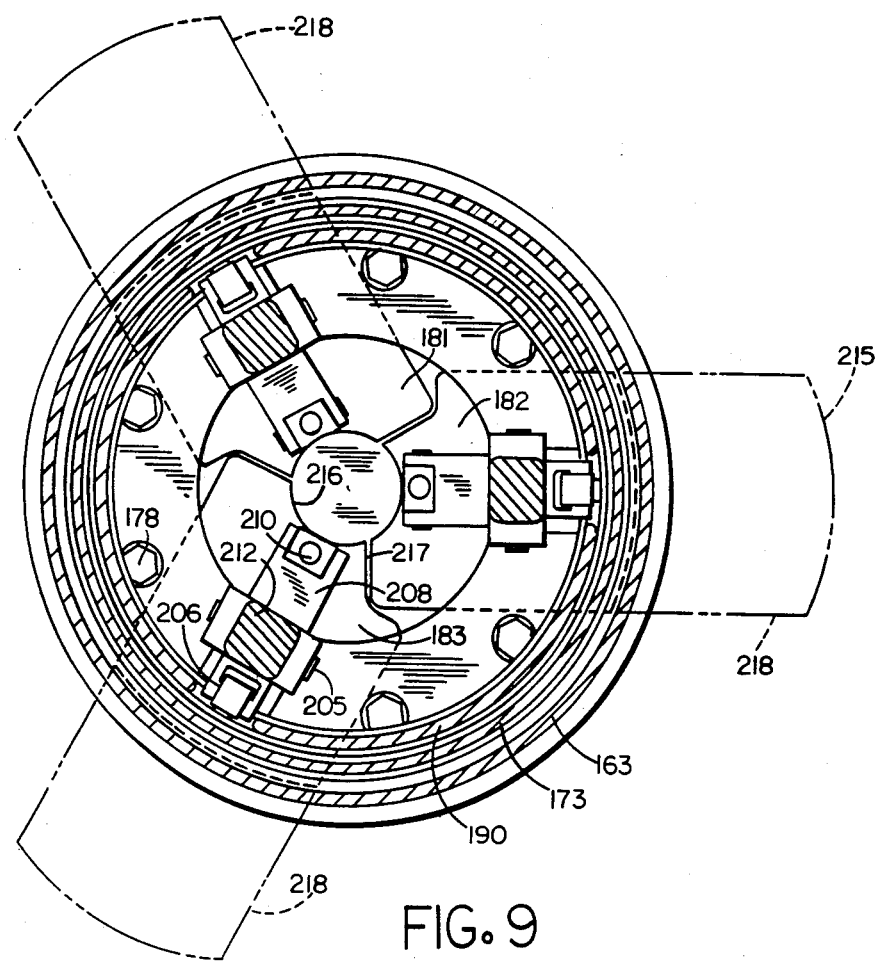
FIG. 9 is a horizontal section of the top center assembly chuck taken from the line 9—9 of FIG. 7.
Figure 10:
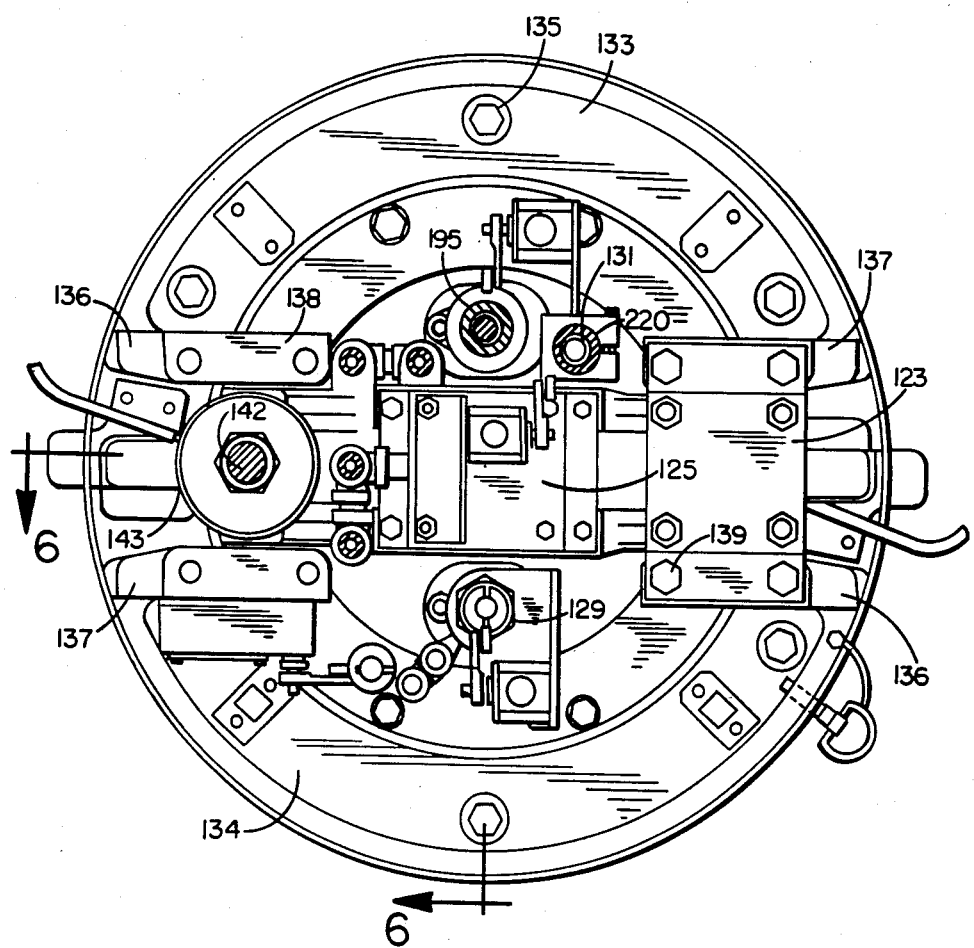
FIG. 10 is a top plan view partly in section of the top center assembly.

As seen more clearly in FIG. 9 the outer edge of each chuck shoe is arcuate as indicated at 215 while the inner edge includes a shorter radius arcuate portion seen at 216 which, when the shoes are fully retracted, provides a circular opening accommodating the top of the post 217 of the center mechanism (see FIG. 7). On one side of the short radius arcuate edge, the inner edge of the shoe may be cut away as seen at 217 to accommodate the non-cut away portion of the inner edge of the adjacent shoe. In this manner the shoes nest together as indicated in their fully retracted position. In any event the piston-cylinder assemblies 129 when retracted cause the shoes to project radially as indicated by the phantom line positions 218, with the opening extent being controlled by adjustable stops 200.

It is noted that the chuck 127 in its retracted position fits neatly and flushly within the upper bead ring 165 and also accommodates and assists in centering the top clamp ring assembly 188 for the shaping bladder. The chuck includes a substantial hollow or open portion beneath the plate 172 and positioned in the center of that portion is an air opening 130 which is connected through pipe 131 and telescoping pipes 220 to a valve assembly which permits the uncured tire to be in essence inflated to snap on the top and bottom mold rings during the loading process.

It is noted that the piston-cylinder assemblies of the top center assembly are mounted for operation in a cascading fashion. For example, when the piston-cylinder assemblies 122 and 123 extend, the piston-cylinder assemblies 125, 128 and 129 all move downwardly. When the piston-cylinder assembly 125 extends piston-cylinder assembly 128 as well as the piston-cylinder assemblies 129 move downwardly. Finally, when the piston-cylinder assembly 128 extends, the piston-cylinder assemblies 129 move therewith. Thus in operation, the piston-cylinder assemblies 122 and 123 will initially be extended to open the sectional mold mechanism, the piston-cylinder assembly 125 will then be extended to move the top bead ring 165 downwardly from the top mold section, and then the piston-cylinder assembly 128 will be extended to move the chuck shoes beneath the now extended top bead ring 165. It is only when the chuck is extended that the shoes 181-183 may then be horizontally extended. This is of course accomplished by retraction of the piston-cylinder assemblies 129.

Referring now to FIGS. 11-15 there is illustrated in more detail the righthand loader assembly seen in FIG. 1. The loader column 57 may be in the form of a tubular column essentially square in horizontal section with guide rail 96 mounted on the face toward the adjacent mold cavities. On the face projecting toward the front of the press there is provided a rod rail 230 on which are mounted preloaded ball bushings 231 and 232 on the interior of elevator 234. As seen more clearly in FIG. 13, the elevator includes a vertically extending portion 35 on which the ball bushings are mounted and which includes an offset portion 236 at its upper end to which rod 237 of piston-cylinder assembly 238 is pivotally connected at 239. The piston-cylinder assembly 238 is trunnion mounted at 241 to brackets 242 extending from the column. The column is in turn secured to the base of the press as indicated at 244 and 245.

The elevator 234 includes two outwardly extending horizontal projections seen at 247 and 248 in which there is journaled vertically extending loader arm pivot shaft 249.

The loader arm 61 includes an outwardly directed mounting surface 252 for the loader chuck assembly hereinafter described and at its inner or proximal end two vertically separated ears or projections 253 and 254 which are keyed to the shaft 249 as seen at 255 in FIG. 14. Thus rotation of the shaft 249 will horizontally swing the loader arm and the loader chuck supported thereby.

In order to swing the loader arm there is provided a rotary actuator indicated at 257 which has its rotary shaft 258 keyed to the top of the swing shaft 249 as indicated at 259.

Figure 15:
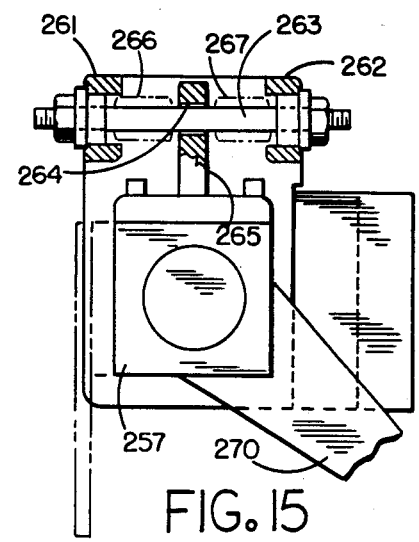
FIG. 15 is a similar horizontal section taken from the line 15—15 of FIG. 13.

Extending upwardly from the top of the elevator are two torque arms 261 and 262 which are interconnected by shaft 263 seen in FIG. 15. Such shaft extends through an enlarged hole 264 in projection 265 extending from the rotary actuator. Belleville washer spring assemblies 266 and 267 on each side of the projection 265 maintain the projection and thus the actuator centered between such torque arms. Such balancing spring assemblies compensate for torque shock loads as the arm moves to and from its limits of movement.

Figure 11:
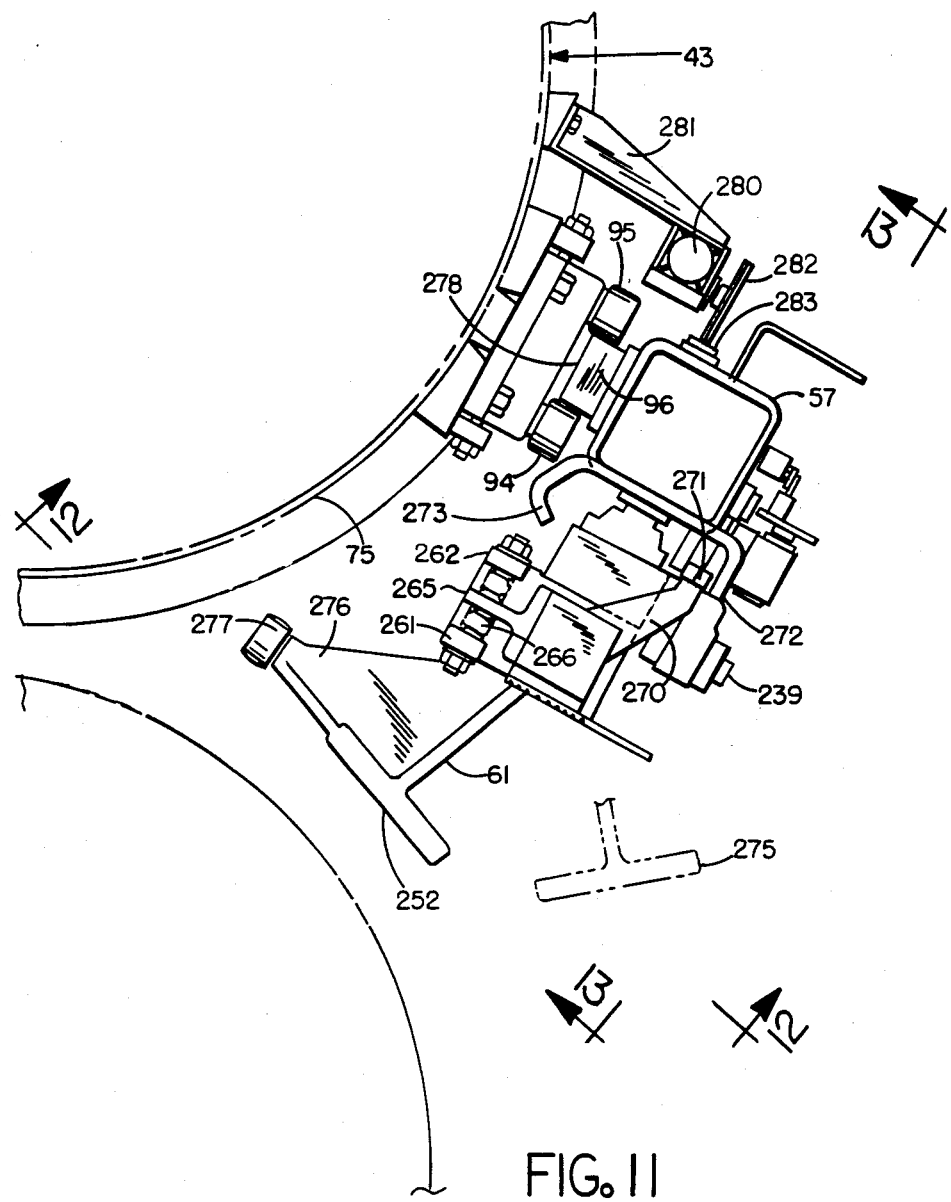
FIG. 11 is a fragmentary top plan view of the right-hand loader column.
Figure 12:
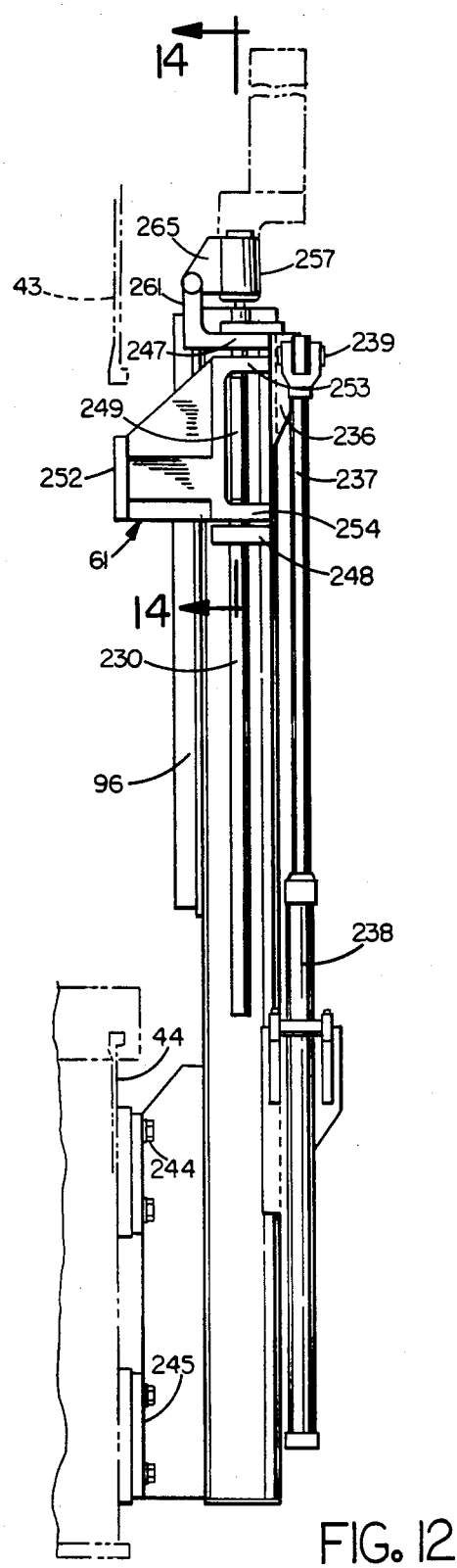
FIG. 12 is a fragmentary elevation of the loader seen from the line 12—12 of FIG. 11 with the loader elevated.
Figure 14:
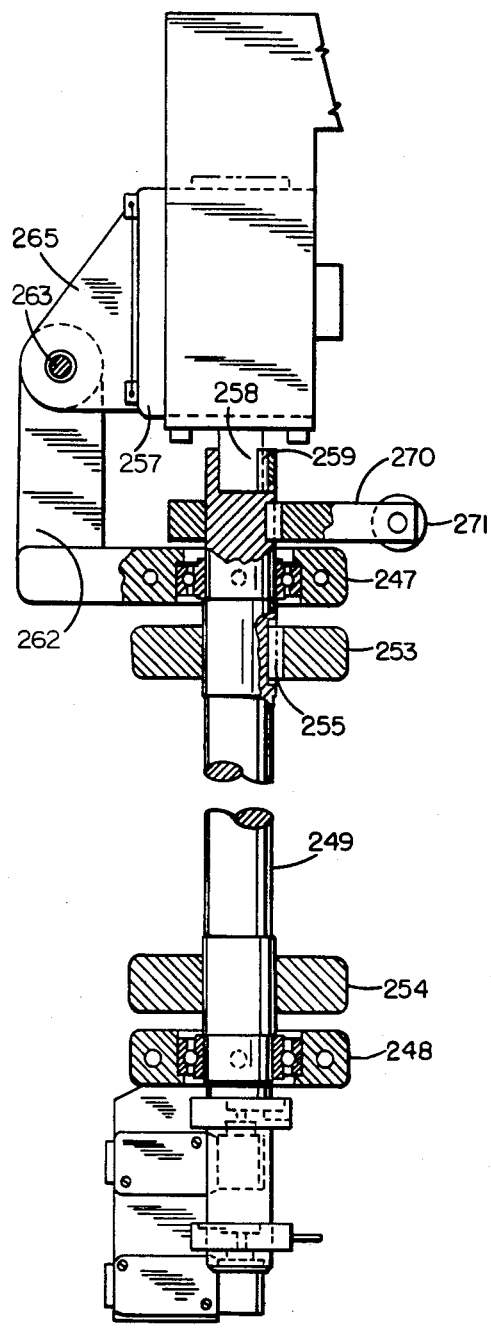
FIG. 14 is an enlarged fragmentary vertical section of the loader taken from the line 14—14 of FIG. 12.

As seen in FIG. 14, also secured to the upper end of the pivot shaft 249 is an arm 270 provided on its outer end with a roller 271. As seen more clearly in FIG. 11 the roller is designed to interfere with confining flange guides or stops 272 and 273 which are mounted on the column 57. For example, the guide 272 prevents the loader arm 61 from swinging in a clockwise direction as seen in FIG. 11 until the roller 271 is vertically clear of the guide 272. This of course precludes the loader arm from swinging the tire into the open press below its required height. The stop guide 273 engages the roller 271 when the loader arm is positioned in the phantom line position seen at 275 which is a position clear of the front of the press permitting access to the front of the press for mold changing, for example.

It is also noted that the loader arm 61 includes a lateral projection 276 on which is mounted roller 277. The roller 277 engages the face 278 of the guide 96 in the load position.

Figure 13:
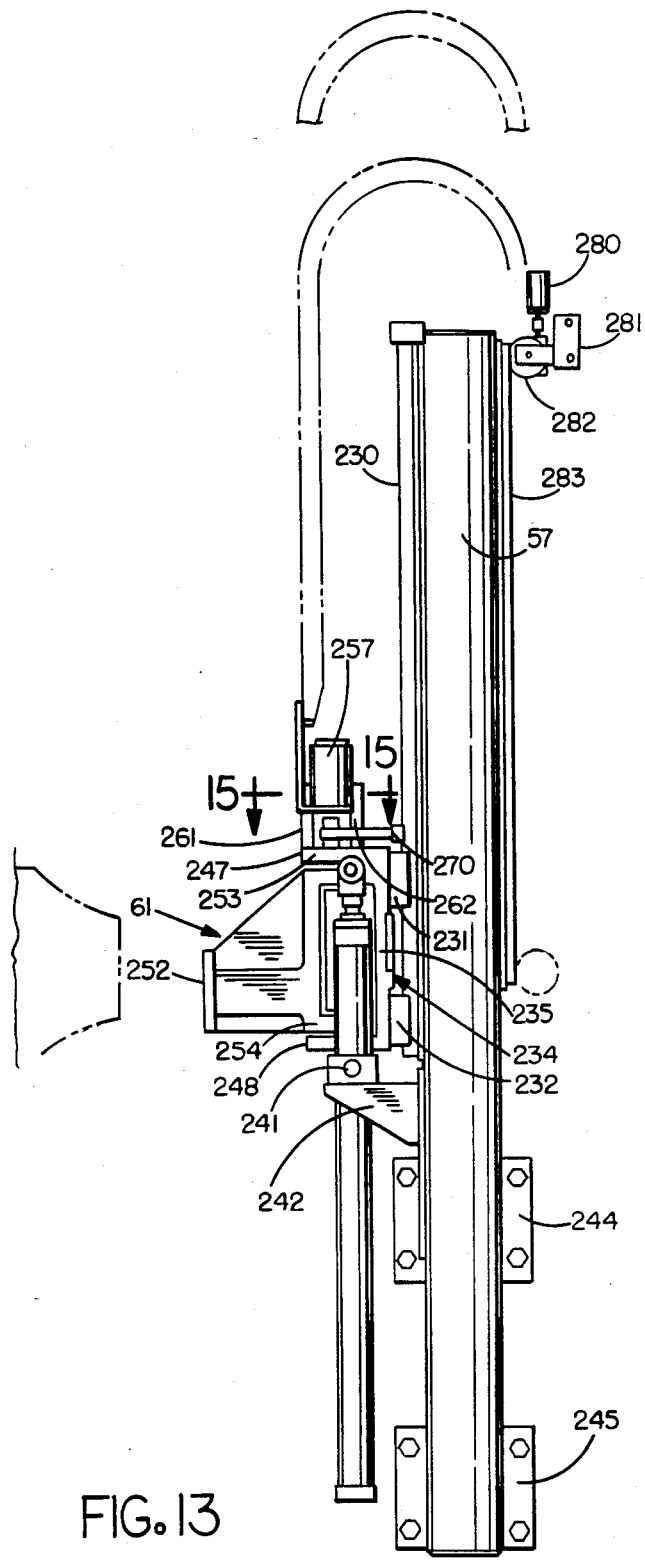
FIG. 13 is a similar elevation seen from the line 13—13 of FIG. 11 with the loader in the pick-up position.

The loader column 57 may also be used as a means for determining the position of the upper cavities during opening and closing of the press. To accomplish this as seen in FIGS. 11 and 13 there is provided a press position encoder 280 which is mounted on bracket 281 secured to the wall 75 of the upper cavity 43. A pinion wheel 282 drives the encoder, such pinion wheel being in mesh with rack 283 mounted on the face of the column opposite the rod rail 230.

As illustrated in FIGS. 11 and 14, limit switches may be mounted along the column and also in a position to be tripped by rotation of the shaft 249.

Referring now to FIGS. 16–24 there is illustrated the loader chuck 59 which comprises a main support ring 285 of L-shape radial section which includes a radial extension 286 providing a mounting face 287 so that the loader may be secured to the loader arm 61 through fasteners 288. The main support ring in turn supports a channel shape ring 290 which may be adjustably centered with respect to the ring 285. The ring 290 is supported on spacers 291 surrounding fasteners 292 which extend through radially elongated slots 293 in the bottom flange 294 of the main support ring 285 (see FIG. 21). The fasteners 292 are threaded into the bottom leg 295 of the ring 290. Radial adjustment of the ring 290 is obtained by jack screws 296 threaded in the vertical wall of the ring 285 and bearing against the vertical wall 297 of the ring 290. There are four adjustment screws 296 and four fasteners 292 quadrant spaced around the rings 285 and 290 and in this manner the ring 290 may be radially adjusted when the fasteners 292 are loosened and then locked in position.

Figure 16:
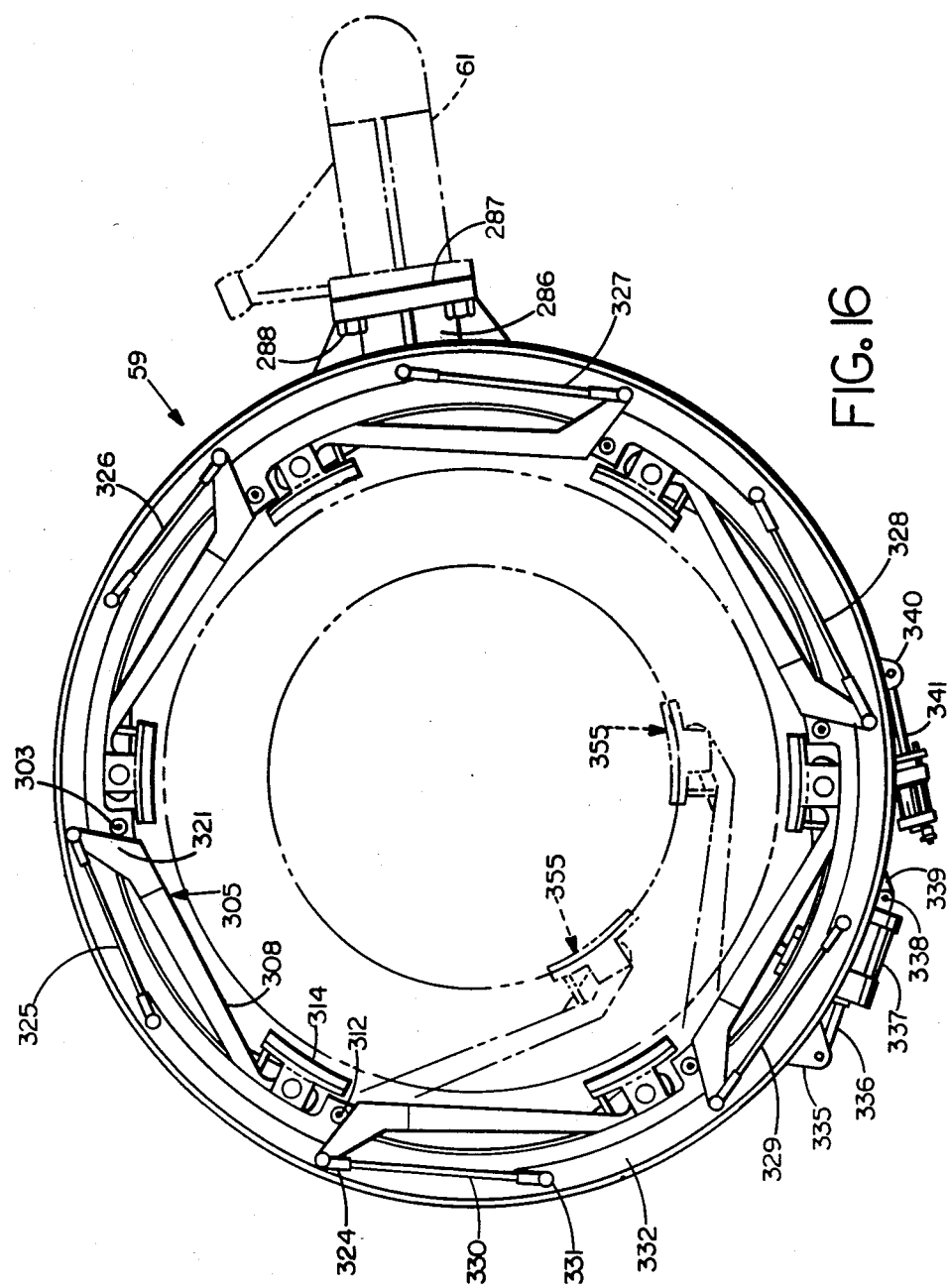
FIG. 16 is a top plan view of a loader chuck.
Figure 21:
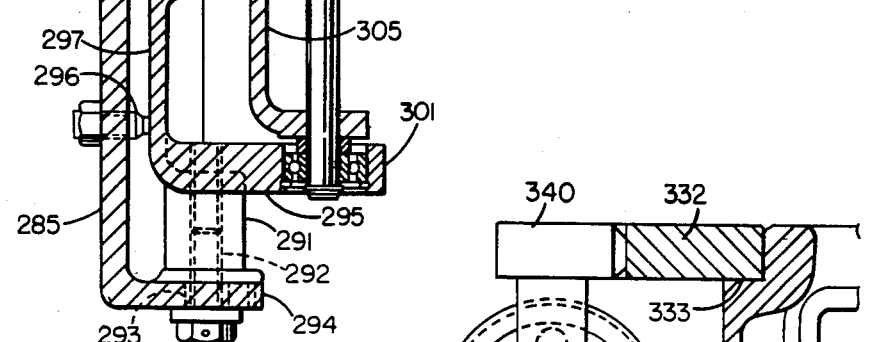
FIG. 21 is a similar section taken from the line 21—21 of FIG. 16.
Figure 22:
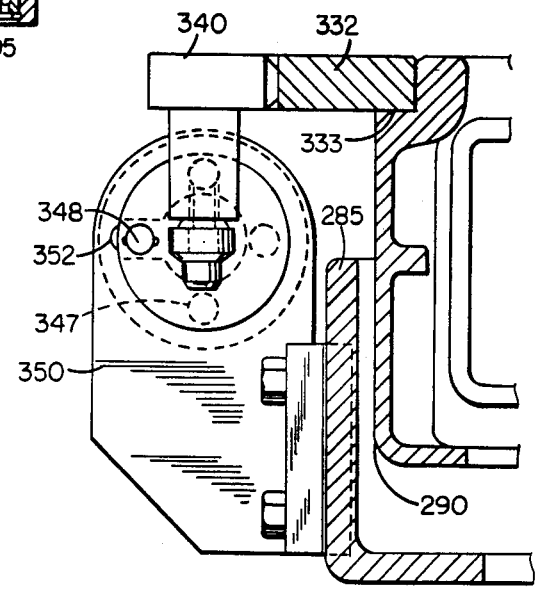
FIG. 22 is a similar section taken from the line 22—22 of FIG. 16.

The ring 290 includes top and bottom inwardly extending projections seen at 300 and 301 in FIG. 21 which are paired vertically and which pairs are equally circumferentially spaced around such ring. Extending through such extensions in journals 302 is a bell crank pivot shaft 303. The pivot shafts 303 provide pivots for bell cranks 305, the configuration of which is shown more clearly in FIGS. 16 and 23. As illustrated in FIG. 16 there are six such bell cranks positioned around the tire chuck ring 290.

Each bell crank 305 includes a long essentially straight tubular arm 308 which is proximally pivotally mounted on the pivot shaft 303. The distal channel shape end of the arm is slightly offset radially inwardly as seen at 309 in FIG. 23 and the top and bottom legs of the channel are enlarged radially inwardly as seen at 310 and 311 in FIG. 20. A vertical pivot shaft 312 extends through such enlargements and a chuck shoe shown generally at 314 is pivoted thereto. The chuck shoe includes an arcuate vertical plate 315 and an inclined lower lip 316. The rear of the shoe is provided with two inwardly extending ears seen at 317 and 318 which are journaled on the pivot shaft 312 as seen at 319.

On the top of each arm at the proximal end there is provided an upwardly extending offset 321 which extends over the ring projection 300 and doglegs radially outwardly to terminate in arm 322, the end of which is provided with a vertically extending pivot pin 323.

As seen in FIG. 16, six connecting rods illustrated at 325, 326, 327, 328, 329 and 330 connect the pins 323 to pins 331 on rotatably movable ring 332 which is mounted on exterior shoulder 333 at the top of ring 290. Each such link includes adjustable ball joint eyes as seen at 331 and 332 in FIG. 23 so that the effective length of the links may be adjusted.

As seen in FIG. 16 the ring includes as projecting ear 335 connected to the rod 336 of piston-cylinder assembly 337. The blind end of the piston-cylinder assembly is pivotally mounted at 338 to bracket 339 mounted on the exterior of ring 285.

Figure 24:
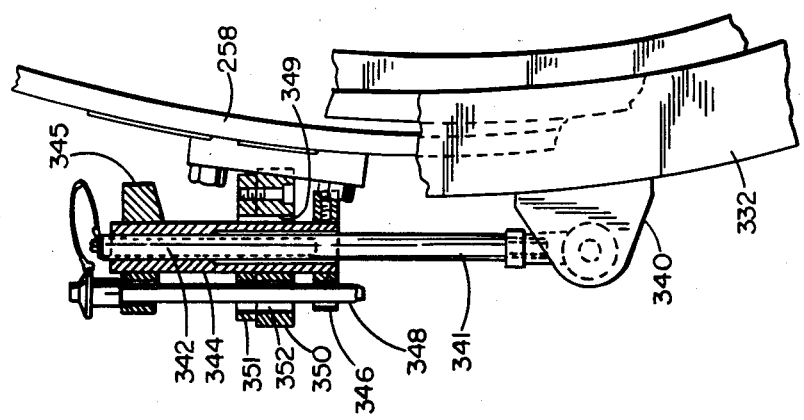
FIG. 24 is a fragmentary top plan view of the stroke adjustment mechanism for the chuck.

Also connected to ring 332 is a bracket 340 to which is pivoted a relatively short rod 341, the end of which is threaded as indicated at 342 in FIG. 24. On such threaded portion there is provided a sleeve nut 344 which includes a thumb or adjusting wheel 345 secured thereto. The sleeve nut also includes secured to the opposite end an annular projection 346 and both the adjusting wheel 345 and the projection 346 include corresponding quadrant spaced apertures 347 seen in FIG. 22 through which a removable locking pin 348 may project. The nut 344 projects through a slightly oversize opening 349 in fixed bracket 350. The bracket is secured to the exterior of ring 285. Secured to the face of the bracket is a steel bumper ring 351. Both the bracket and the bumper ring are provided with aligned radial slots as indicated at 352 which accommodate the movable locking pin 348. In this manner the locking pin may be removed and the sleeve nut rotated on the rod 341. The nut may then be relocked in position as illustrated for every quarter turn of the nut.

In operation, the piston-cylinder assembly 337 retracts to rotate ring 332 to swing each of the bell cranks or arms 305 to move the shoes 315 radially inwardly until the thumb wheel portion 345 of the nut 344 engages the bumper ring 351. In such condition the shoes will be brought to an adjusted position as seen at 355 in FIG. 16 such that the inclined lower lip 316 is beneath the bottom shoulder of the tread. The adjusted stop position then avoids putting pressure on the tread of the uncured tire. To open the chuck the piston-cylinder assembly is extended.

Figure 17:
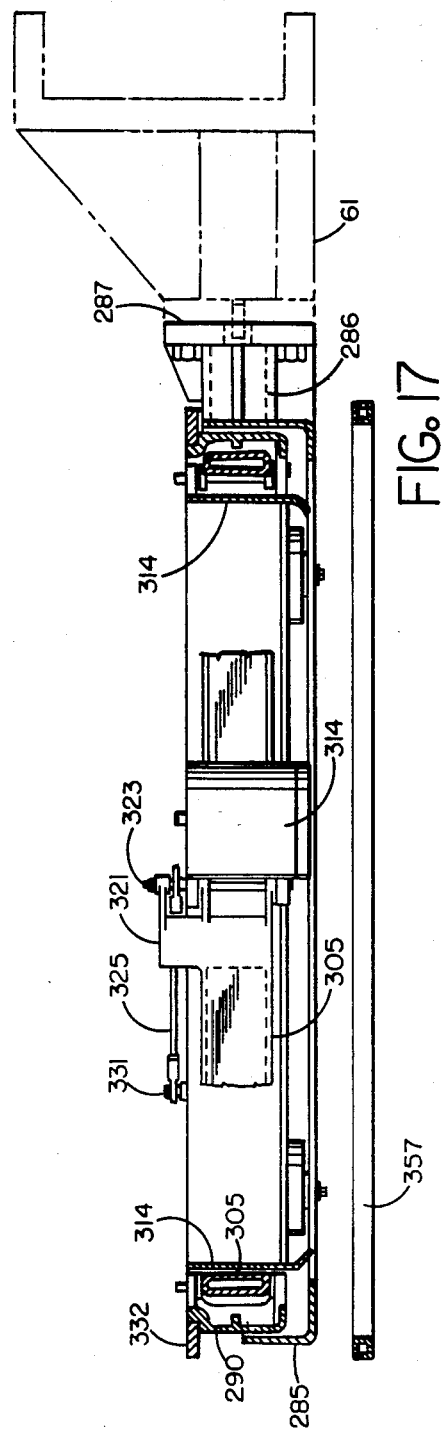
FIG. 17 is a diametral vertical section of the chuck with parts broken away.
Figure 18:
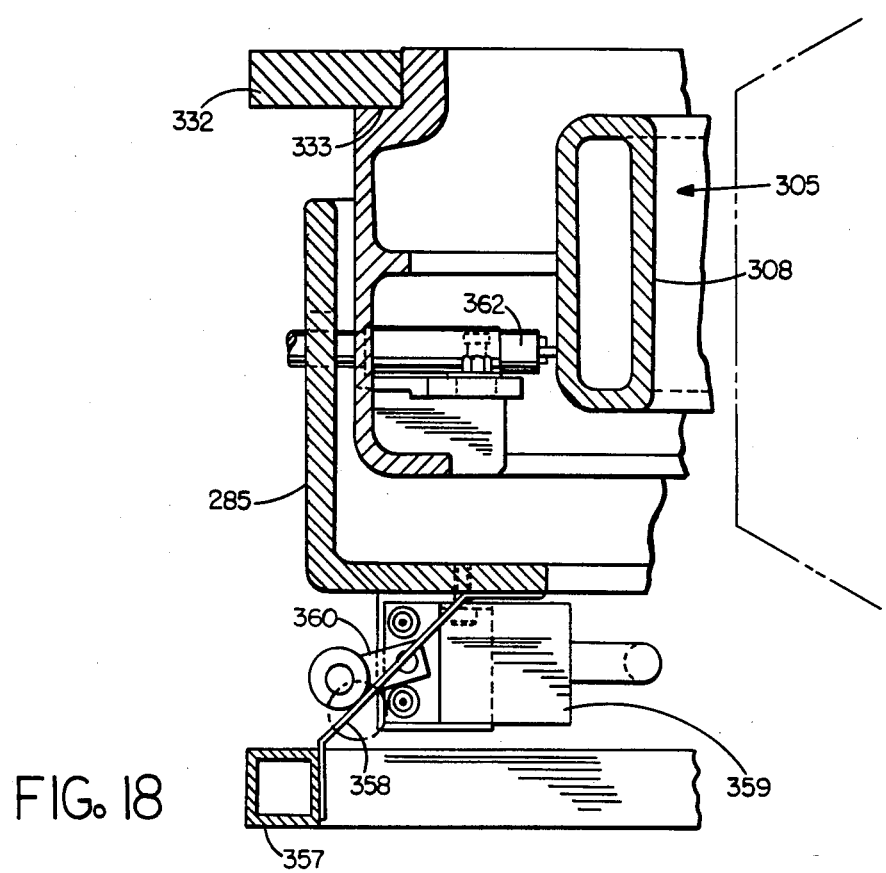
FIG. 18 is a fragmentary vertical radial section taken from the line 18—18 of FIG. 16.

As seen in FIGS. 17 and 18 each loader chuck may be provided with an annular depending safety bar 357 which is of a diameter to project slightly beyond the main support ring 285. The safety bar or ring 357 is supported by three fairly thin flexible metal spring strips 358. A limit switch 359 includes a trip arm 360 resting against one of such strips so that any movement of the safety ring 357 will cause the limit switch 359 to trip stopping the loader. The limit switch 362 seen in FIG. 18 signals the retraction of the arms 305 or the open condition of the chuck.

Figure 19:
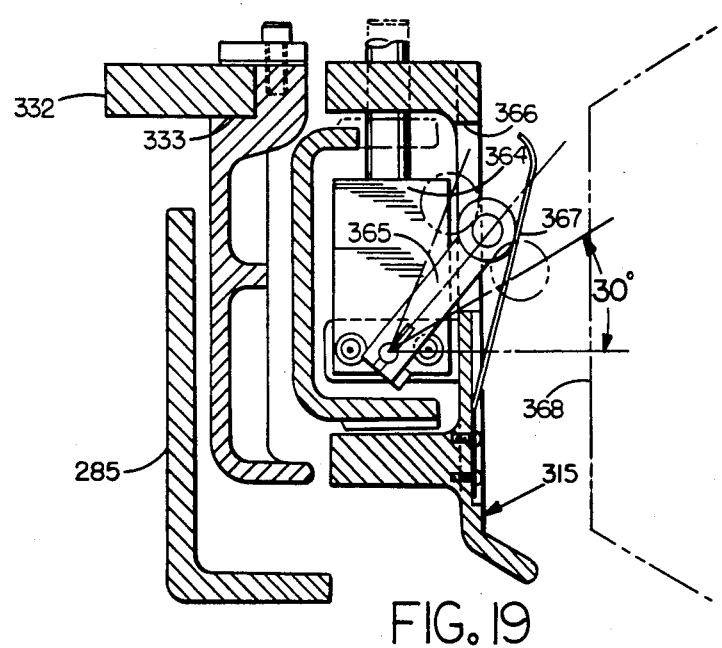
FIG. 19 is a similar section taken from the line 19—19 of FIG. 16.
Figure 20:
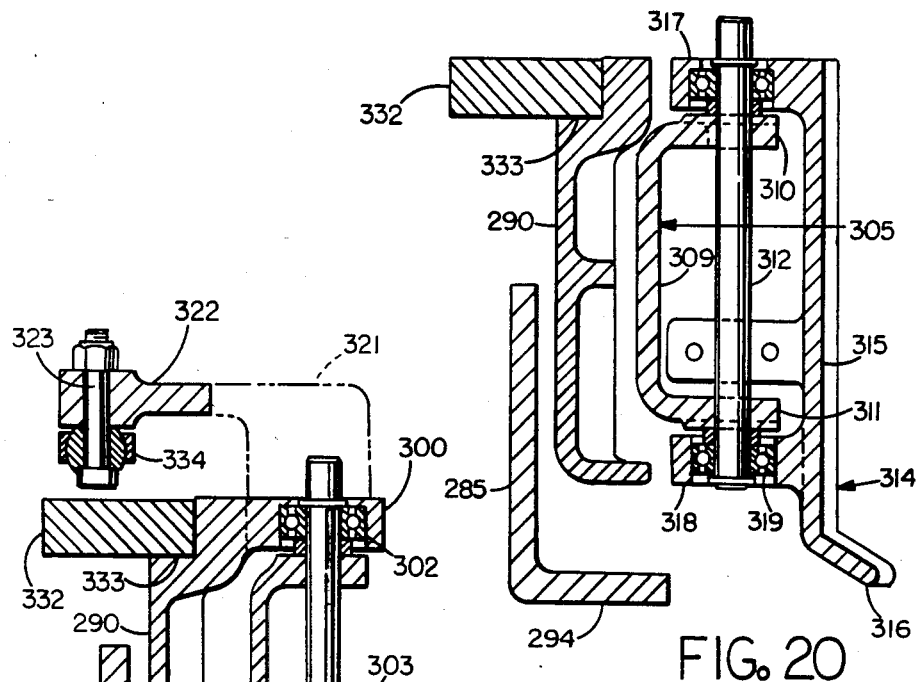
FIG. 20 is a similar section taken from the line 20—20 of FIG. 16.
Figure 23:
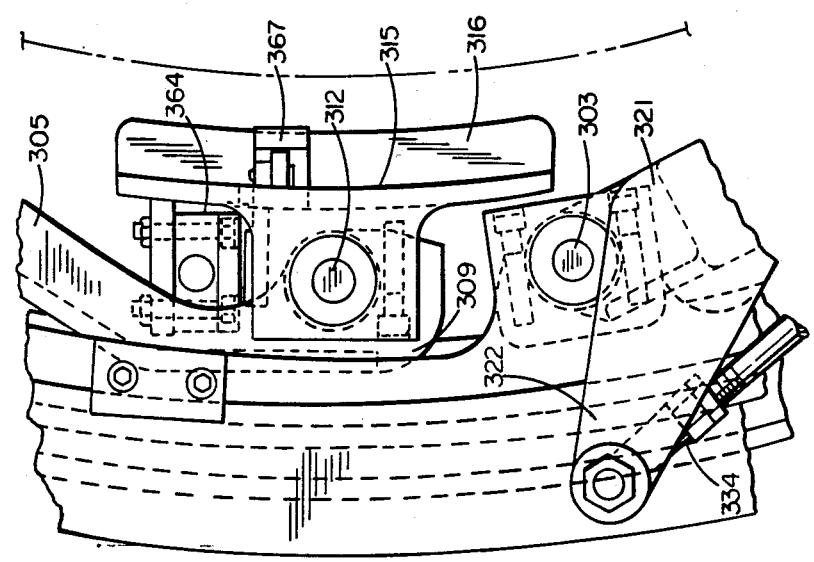
FIG. 23 is an enlarged fragmentary top plan view of a portion of the chuck.

As seen in FIGS. 19 and 23 there is provided a limit switch 364 mounted on the back of one of the shoes 315. The limit switch includes a trip arm 365 projecting through window 366 in the face of the shoe. A leaf spring 367 mounted to the face of the shoe engages the trip arm. Thus when the leaf spring engages the tread 368 of the tire the trip arm will cause the limit switch to actuate signaling the presence of the tire.

Referring now to schematic FIGS. 25–33 there is illustrated in sequence a portion of the loading cycle which may be achieved with the press of the present invention. In such figures there is illustrated schematically the top mold section 370, the bottom mold section 371, the bottom bead ring 372 which is mounted on top of vertically movable well 373. Also shown is the shaping bladder 375 which is held between clamping ring assemblies 188 and 376. It will be appreciated that the bottom bead ring, well and the bladder and bladder clamping ring are part of the center mechanism of the tire and are actuated each for vertical movement by piston-cylinder assemblies not shown.

As seen initially in FIG. 25 the press is open and a cured tire has been cleared therefrom. The loader chuck 59 then swings an uncured tire T into the position shown between the top and bottom mold sections. As seen in FIG. 26 the top center assembly extends moving the top bead ring 165 down to the position shown. In such FIG. 26 position the radially movable shoes 183 are still retracted. Further extension of the top center assembly extends the chuck to a position beneath the top bead ring 165 and the shoes 183 move radially outwardly as seen in FIG. 27.

In FIG. 28 the top center assembly has retracted to elevate the tire T from the loader basket 59. The upper bead of the uncured tire is positioned adjacent the top bead ring 165. As seen in FIG. 29 the loader basket 59, now empty, may descend and swing out of the press to the load or pick-up position seen in FIG. 30. When the loader is thus clear, the top mold section moves downwardly until the bottom bead of the tire T is adjacent the bottom bead ring 372 on the extended well 373. At this point the chuck in the top center assembly is still supporting the tire, and air pressure is admitted through the inlet 130 as indicated by the arrow 378 and the pressurized envelope of the tire then snaps the upper and lower beads on the top and bottom bead rings, respectively. While this is taking place the loader basket 59 may move downwardly to pick up the next uncured tire 380 positioned on loader stand 381 in front of the press.

In FIG. 31 the chuck shoes of the top center assembly retract radially and the chuck is then retracted upwardly. In FIG. 32 the top mold section 370 has descended in synchronism with the bottom bead 372 as the bladder 375 enters the tire. Reference may be had to applicant's prior U.S. Pat. No. 4,597,729 issued July 1, 1986 for an illustration of the mechanism which causes the bottom bead 372 to descend in synchronism with the top mold section.

As the bladder enters the tire the bladder bead ring assemblies 188 and 376 are brought to a position adjacent each other at the approximate mid-plane of the tire and the bladder is partially inflated to cause initial contact between the bladder and the inside of the tire at such mid-plane position seen at 383.

As seen in FIG. 33 the bladder clamp ring assemblies 188 and 376 now separate uniformly as the bladder is brought to its final shaping position. During such shaping the press may continue to close. Also, at this time vacuum may be applied both above and below the bladder in the chambers 385 and 386. In this manner air entrapment between the bladder and the interior of the tire is minimized.

The press continues to its fully closed position and the cure cycle commences. In the meantime the loader basket has picked up a further uncured tire from the stand 381 and holds it in an elevated position. Then some time during the cure cycle a further uncured tire may be positioned on the cure stand.

The above described process is of course exemplary only and it will occur to others skilled in the art that such process may be modified with the apparatus illustrated.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the following claims.

I claim:

1. A tire loader for a tire press comprising a vertically extending guide rail, an elevator mounted on said rail for vertical movement, an arm including a vertical shaft pivotally mounted on said elevator for horizontal swinging, a loader chuck on the end of said arm, a rotary actuator on said vertical shaft for swinging said arm, and torque shock absorbing spring means between said actuator and said elevator.

2. A tire loader as set forth in claim 41 wherein said actuator includes a projecting arm, and said elevator includes two torque arms on each side thereof, and spring means interposed between said projecting arm and torque arms.

3. A tire loader as set forth in claim 1 wherein said spring means comprise belleville washer assemblies.

4. A tire loader as set forth in claim 3 including roller guide means limiting swinging of said arm.

5. A tire loader as set forth in claim 4 wherein said loader is mounted on a column, and a guide rail on said column, a guide roller on said arm operative to engage said rail when said arm is in loading position.

6. A tire loader as set forth in claim 5 including the tire press, said press comprising a fixed bottom mold cavity and a vertically movable upper mold cavity, and means to guide said upper mold cavity on said rail.

7. A tire loader as set forth in claim 6 including a further guide roller on said arm, and interfering stop means on said column to limit swinging of said arm until said arm has cleared the bottom mold cavity.

8. A tire loader as set forth in claim 1 wherein said loader chuck comprises an annular frame adapted to surround the tread portion of a tire, a series of horizontally extending bell cranks mounted on said frame each pivoted on a vertical axis, a tire tread gripping shoe mounted on one end of each bell crank operative to move radially of said frame when the respective bell crank swings on its vertical axis, and an actuator operative to swing said bell cranks in unison.

9. A tire loader as set forth in claim 8 wherein each bell crank includes a long arm and a short arm, said shoes being pivoted to the ends of each long arm on a vertical axis.

10. A tire loader as set forth in claim 9 including tie rods respectively interconnecting said bell cranks to a rotating ring.

11. A tire loader as set forth in claim 10 including a piston-cylinder assembly operative to rotate said ring.

12. A tire loader as set forth in claim 11 including adjustable stop means for said ring to limit the extent of movement of said bell cranks.

13. A tire loader as set forth in claim 13 wherein said annular frame includes an inner ring and an outer ring, and means to center said inner ring in said outer ring.

14. A tire loader as set forth in claim 1 wherein said tire loader chuck comprises an annular frame, a series of bell cranks mounted on said frame and pivoted about vertical axes, a tire gripping shoe mounted on one end of each bell crank, and means to swing said bell cranks in unison to cause said shoes to move radially to grip and release a tire within the frame.

15. A tire loader as set forth in claim 14 wherein each bell crank includes a long arm and a short arm, and tie rods connected to said short arms to move said cranks in unison.

16. A tire loader as set forth in claim 15 including an actuator to move said cranks, and an adjustable stop limiting the swinging of said cranks.

17. A tire loader as set forth in claim 16 including a rotating ring, said tie rods being each pivoted to said ring.

18. A tire loader as set forth in claim 13 including a chuck shoe vertically pivoted to the distal end of each long arm.

19. A tire loader as set forth in claim 18 wherein the distal end of each long arm is offset radially inwardly.

20. A tire loader as set forth in claim 19 wherein each short arm is offset above and radially outwardly of the bell crank pivot.

21. A tire loader as set forth in claim 20 wherein said annular frame includes an inner ring and an outer ring, and means to center said inner ring in said outer ring.

22. A loader chuck for a tire comprising an annular frame adapted to surround the tread portion of a tire, a series of horizontally extending bell cranks mounted on said frame each pivoted on a vertical axis, a tire tread gripping shoe mounted on one end of each bell crank operative to move radially of said frame when the respective bell crank swings on its vertical axis, and an actuator operative to swing said bell cranks in unison.

23. A chuck as set forth in claim 22 wherein each bell crank includes a long arm and a short arm, said shoes being pivoted to the ends of each long arm on a vertical axis.

24. A chuck as set forth in claim 23 including tie rods respectively interconnecting said bell cranks to a rotating ring.

25. A chuck as set forth in claim 24 including a piston-cylinder assembly operative to rotate said ring.

26. A chuck as set forth in claim 25 including adjustable stop means for said ring to limit the extent of movement of said bell cranks.

27. A chuck as set forth in claim 22 wherein said annular frame includes an inner ring an outer ring, and means to center said inner ring in said outer ring.

28. A loader chuck for a tire press comprising an annular frame, a series of bell cranks mounted on said frame and pivoted about vertical axes, a tire gripping shoe mounted on one end of each bell crank, and means to swing said bell cranks in unison to cause said shoes to move radially to grip and release a tire within the frame.

29. A chuck as set forth in claim 28 wherein each bell crank includes a long arm and a short arm, and tie rods connected to said short arms to move said cranks in unison.

30. A chuck as set forth in claim 28 including an actuator to move said cranks, and an adjustable stop limiting the swinging of said cranks.

31. A chuck as set forth in claim 30 including a rotating ring, said tie rods being each pivoted to said ring.

32. A chuck as set forth in claim 29 including a chuck shoe vertically pivoted to the distal end of each long arm.

33. A chuck as set forth in claim 32 wherein the distal end of each long arm is offset radially inwardly.

34. A chuck as set forth in claim 33 wherein each short arm is offset above and radially outwardly of the bell crank pivot.

35. A chuck as set forth in claim 34 wherein said annular frame includes an inner ring and an outer ring, and means to center said inner ring in said outer ring.

* * * * *